United States Patent
Valine et al.

(10) Patent No.: US 10,776,506 B2
(45) Date of Patent: *Sep. 15, 2020

(54) SELF-MONITORING TIME SERIES DATABASE SYSTEM THAT ENFORCES USAGE POLICIES

(71) Applicant: salesforce.com, inc., San Francisco, CA (US)

(72) Inventors: Thomas Nicholas Valine, San Jose, CA (US); Bhinav Sura, San Mateo, CA (US); Rajavardhan Sarkapally, San Francisco, CA (US); Dilip Devaraj, Colma, CA (US)

(73) Assignee: salesforce.com, inc., San Francisco, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 14/980,459

(22) Filed: Dec. 28, 2015

(65) Prior Publication Data
US 2017/0185797 A1    Jun. 29, 2017

(51) Int. Cl.
*G06F 21/62*    (2013.01)
*G06F 16/958*    (2019.01)

(52) U.S. Cl.
CPC ........ *G06F 21/6227* (2013.01); *G06F 16/958* (2019.01)

(58) Field of Classification Search
CPC .......................... G06F 17/3051; G06F 16/958
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 13/986,251, filed Apr. 16, 2013.

*Primary Examiner* — Mohammad S Rostami
(74) *Attorney, Agent, or Firm* — Dergosits & Noah LLP; Todd A. Noah

(57) ABSTRACT

A self-monitoring time series database system which enforces usage policies is described. A time series database system receives an alert trigger condition for a system user, wherein the system user is associated with multiple time series data points corresponding to multiple subsystems of the time series database system. The time series database system aggregates the multiple time series data points in an internal time series data point, which is internal to the time series database system, associated with the system user. The time series database system evaluates whether the internal time series data point associated with the system user meets the alert trigger condition. The time series database system reduces a level of access by the system user to the time series database system in response to an evaluation that the internal time series data point associated with the system user meets the alert trigger condition.

18 Claims, 4 Drawing Sheets

(56) References Cited

U.S. PATENT DOCUMENTS

| | | | |
|---|---|---|---|
| 5,963,953 A | 10/1999 | Cram et al. | |
| 6,065,014 A | 5/2000 | Wakio et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,554,699 B2 * | 10/2013 | Ruhl | G06F 17/3089 |
| | | | 706/12 |
| 8,566,301 B2 | 10/2013 | Rueben et al. | |
| 8,646,103 B2 | 2/2014 | Jakobson et al. | |
| 8,682,773 B1 | 3/2014 | Murphy et al. | |
| 9,317,539 B2 | 4/2016 | Sato et al. | |
| 9,516,053 B1 | 12/2016 | Muddu et al. | |
| 9,753,935 B1 | 9/2017 | Tobin et al. | |
| 9,848,007 B2 * | 12/2017 | Chen | G06F 21/552 |
| 10,476,903 B2 | 11/2019 | Wilson | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0154914 A1 * | 6/2008 | Kan | G06F 11/1458 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0216979 A1 * | 8/2009 | Balasubramanian | |
| | | | G06F 12/1491 |
| | | | 711/163 |
| 2010/0131533 A1 | 5/2010 | Ortiz | |
| 2011/0119226 A1 * | 5/2011 | Ruhl | G06F 17/3089 |
| | | | 706/52 |
| 2011/0231248 A1 | 9/2011 | Vee et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0326109 A1 * | 12/2013 | Kivity | G06F 9/5016 |
| | | | 711/6 |
| 2014/0032506 A1 | 1/2014 | Hoey et al. | |
| 2014/0039683 A1 | 2/2014 | Zimmermann et al. | |
| 2014/0040276 A1 * | 2/2014 | Chen | G06F 17/30551 |
| | | | 707/746 |
| 2014/0149466 A1 * | 5/2014 | Sato | G06F 16/21 |
| | | | 707/803 |
| 2014/0337474 A1 | 11/2014 | Khuti et al. | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

(56) References Cited

U.S. PATENT DOCUMENTS

| | | |
|---|---|---|
| 2015/0205691 A1 | 7/2015 | Seto |
| 2016/0062950 A1 | 3/2016 | Brodersen et al. |
| 2016/0065604 A1 | 3/2016 | Chen et al. |
| 2016/0092484 A1* | 3/2016 | Finkler .............. G06F 16/2272 707/715 |
| 2016/0092516 A1 | 3/2016 | Poola et al. |
| 2016/0098176 A1* | 4/2016 | Cervelli ............ G06F 17/30551 715/804 |
| 2016/0103908 A1 | 4/2016 | Fletcher et al. |
| 2016/0203036 A1 | 7/2016 | Mezic et al. |
| 2016/0224660 A1* | 8/2016 | Munk ................... G06F 16/316 |
| 2016/0317781 A1 | 11/2016 | Proud |
| 2016/0321906 A1* | 11/2016 | Whitney .............. G06F 3/0484 |
| 2016/0342910 A1 | 11/2016 | Chu et al. |
| 2016/0370946 A1 | 12/2016 | Hama et al. |
| 2016/0378753 A1 | 12/2016 | Taylor et al. |
| 2017/0148264 A1 | 5/2017 | Pichette et al. |
| 2017/0177636 A1 | 6/2017 | Nguyen et al. |

* cited by examiner

SELF-MONITORING TIME SERIES DATABASE SYSTEM THAT ENFORCES USAGE POLICIES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Time series data is a sequence of data points, typically consisting of successive measurements made over a time interval. Examples of time series data are ocean tides, counts of sunspots, and the daily closing value of the Dow Jones Industrial Average. Time series data is frequently plotted via line charts. Many domains of applied science and engineering which involve temporal measurements use time series data. Time series data analysis comprises methods for analyzing time series data in order to extract meaningful statistics and other characteristics of the data. Time series data forecasting is the use of a model to predict future values based on previously observed values. A time series database is a computer system that is optimized for handling time series data. In some fields, time series data is called a profile, a curve, or a trace. Despite the disparate names, many of the same mathematical operations, queries, or database transactions are useful for analyzing each of these time series data types. The implementation of a computerized database system that can correctly, reliably, and efficiently implement these operations must be specialized for time series data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
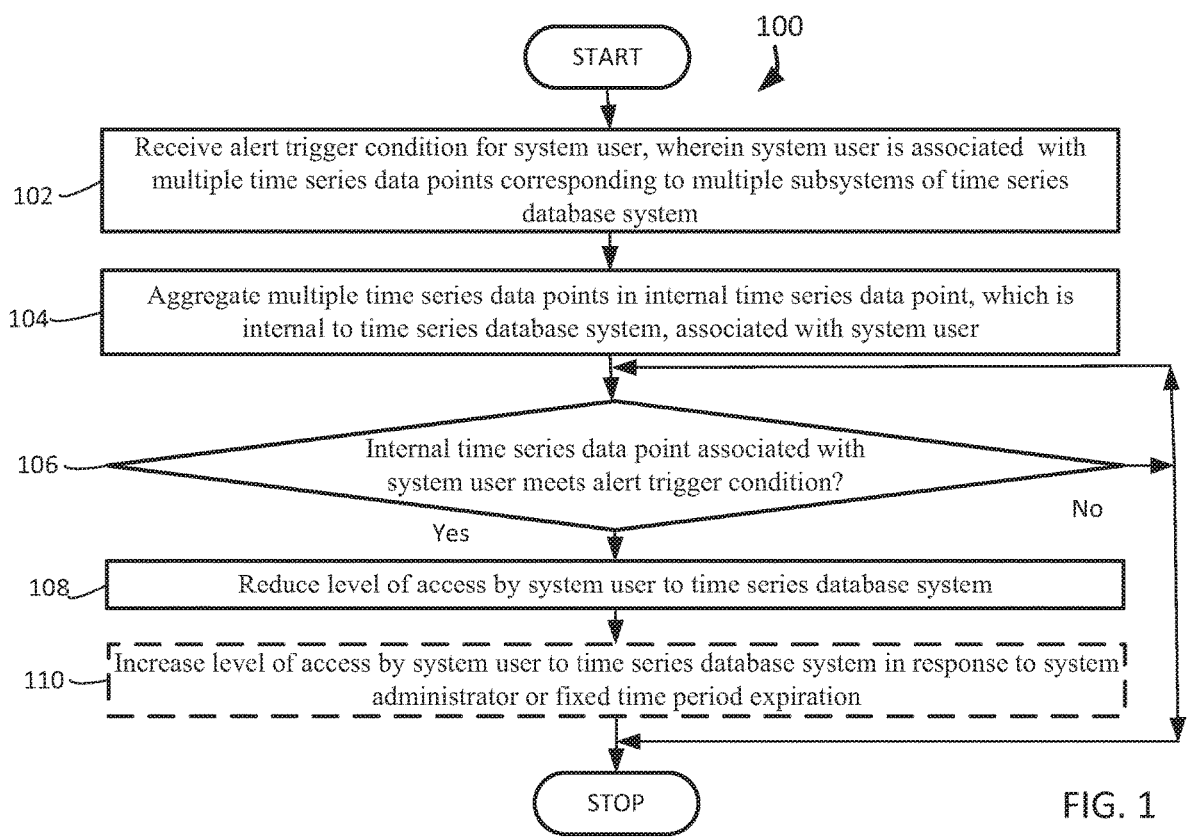
FIG. 1 is an operational flow diagram illustrating a high level overview of a method for a self-monitoring time series database system which enforces usage policies, in an embodiment.

Systems and methods are provided for a self-monitoring time series database system which enforces usage policies. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for a self-monitoring time series database system which enforces usage policies will be described with reference to example embodiments. The following detailed description will first describe a method for a self-monitoring time series database system which enforces usage policies.

In accordance with embodiments described herein, there are provided methods and systems for a self-monitoring time series database system which enforces usage policies. One skilled in the art will understand that a time series database system is a computer system that is optimized for handling time series data, but may be able to handle other data as well. A time series database system receives an alert trigger condition for a system user, wherein the system user is associated with multiple time series data points corresponding to multiple subsystems of the time series database system. The time series database system aggregates the multiple time series data points in an internal time series data point, which is internal to the time series database system, associated with the system user. The time series database system evaluates whether the internal time series data point associated with the system user meets the alert trigger condition. The time series database system reduces a level of access by the system user to the time series database system in response to an evaluation that the internal time series data point associated with the system user meets the alert trigger condition.

For example, a system administrator for a time series database system submits an alert trigger condition of 1,500 web service API calls per minute for the system user named John Smith for when Smith uses a cluster of 5 computer nodes, and the time series database system identifies 5 time series data points associated with the system user John Smith, which indicate Smith's web service API calls for the 5 computer nodes within the time series database system. The time series database system: 1) creates a global counter, 2) aggregates the 5 time series data points which indicate Smith's web service API calls for the 5 computer nodes into the global counter, 3) disables subsystem aggregation to the global counter, 3) copies the aggregated value of 1,600 in the global counter to a data structure, 4) resets the global counter, enables subsystem aggregation to the global counter, and 5) persists the aggregated value of 1,600 in the data structure to an internal time series data point for the system user John Smith in the time series database system.

The time series database system evaluates whether the internal time series data point aggregating the 5 time series data points, which indicate Smith's 1,600 web service API calls for the 5 computer nodes, meets the alert trigger condition of 1,500 web service API calls per minute for the time series database system. The time series database system temporarily suspends John Smith's access to the time series database system because the evaluation of the internal time series data point indicates that Smith's 1,600 web service API calls for the 5 computer nodes meets the alert trigger condition of 1,500 web service API calls per minute for the time series database system. The self-monitoring time series database system that enforces usage policies can selectively reduce the access of a user who may be abusing or misusing the system, thereby preserving normal system access for the other users, even if the system user is not exceeding any thresholds for system subcomponents.

While one or more implementations and techniques are described with reference to an embodiment in which a self-monitoring time series database system which enforces usage policies is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 is an operational flow diagram illustrating a high level overview of a method 100 for a self-monitoring time series database system that enforces usage policies. A time series database system receives an alert trigger condition for a system user, wherein the system user is associated with multiple time series data points corresponding to multiple subsystems of the time series database system, block 102. For example and without limitation, this can include a system administrator for a time series database system submitting an alert trigger condition of 1,500 web service API calls per minute for the system user named John Smith for when Smith uses a cluster of 5 computer nodes, and alert trigger conditions of 500 web service API calls per minute for Smith for when he uses each of the 5 computer nodes. Continuing this example, the time series database system identifies 5 time series data points associated with the system user John Smith, which indicate Smith's web service API calls for the 5 computer nodes within the time series database system.

Although the foregoing example describes the time series database system identifying the multiple time series data points that are associated with the alert trigger condition, a system administrator may identify the multiple time series data points that are associated with the alert trigger condition when submitting the alert trigger condition. While this example describes the time series database system receiving and processing a single alert trigger condition for one system user who is associated with multiple time series data points corresponding to multiple subsystems of the time series database system, the time series database system may receive and process any number of alert trigger conditions for any number of system users. Even though this example describes the time series database system receiving an alert trigger condition for a system user from a system administrator, the time series database may also receive an alert trigger condition for a system user from a configuration file.

For example, upon startup, the time series database system initially receives an alert trigger condition of 2,000 web service API calls per minute for each system user from a configuration file that was pre-configured prior to startup of the time series database system. Continuing this example, after months of operation, the time series database system receives an alert trigger condition of 1,500 web service API calls per minute for each system user from a system administrator who decided that the alert trigger condition of 2,000 web service API calls per minute for each system user was set too high for responding to the corresponding alert notification in a timely manner.

In another example, the time series database system receives an alert trigger condition of 1,500 web service API calls per minute for John Smith from a system administrator who submitted an alert trigger condition of 2,000 web service API calls per minute for Mary Jones because Jones pays more for system access than Smith pays for system access.

After receiving the alert trigger condition for a system user who is associated with multiple time series data points, the time series database system aggregates the multiple time series data points in an internal time series data point, which is internal to the time series database system, associated with the system user, block 104. By way of example and without limitation, this can include the time series database system: 1) creating a global counter, aggregating the 5 time series data points that indicate Smith's web service API calls for the 5 computer nodes into the global counter, 2) disabling subsystem aggregation to the global counter, 3) copying the aggregated value of 1,600 in the global counter to a temporary data structure, 4) resetting the global counter to zero, 5) enabling subsystem aggregation to the global counter, and 6) persisting the aggregated value of 1,600 in the temporary data structure to an internal time series data point for the system user John Smith in the time series database system.

Although this example describes the time series database system aggregating a single internal time series data point for one system user from multiple corresponding time series data points, the time series database system may aggregate any number of internal time series data points for any number of system users from their multiple corresponding time series data points. While this example describes the time series database system copying the aggregated value in the global counter to a temporary data structure, and then persisting the aggregated value in the temporary data structure to an internal time series data point for a system user, the time series database system may copy the aggregated value in the global counter to an internal time series data point for the system user.

After aggregating the multiple time series data points in the internal time series data point for a system user, the time series database system evaluates whether the internal time series data point associated with the system user meets the alert trigger condition, block 106. In embodiments, this can include the time series database system evaluating whether the internal time series data point aggregating the 5 time series data points that indicate Smith's 1,600 web service API calls for the 5 computer nodes, meets the alert trigger condition of 1,500 web service API calls per minute for the time series database system. Although this example describes an alert trigger condition for a system user based on an internal time series data point associated with the system user meeting an alert threshold only once, the alert trigger condition for the system user may be met only when an internal time series data point associated with the system user meets an alert threshold for any time period, such as 5 consecutive minutes. Similarly, the alert trigger condition for the system user may be met only when an internal time series data point associated with the system user meets an alert threshold any number of times in any time period, such as by meeting an alert threshold at least 7 times in any time period of 13 consecutive minutes. Even though this example describes the time series database system evaluating an internal time series data point associated with a system user on a minute-to-minute basis, the periodic evaluation period may be of any time duration, such as seconds or hours. While this example describes the time series database system evaluating whether a single internal time series data point associated with a single system user meets a single alert trigger condition, the time series database system may evaluate any number of internal time series data points associated with any number of system users, and the time series database system may evaluate whether each one of these internal time series data points associated with any number of system users meets any number of alert trigger conditions.

If the internal time series data point associated with a system user does not meet the alert trigger condition for the system user, the method 100 remains at block 106 to evaluate another alert trigger condition for the internal time series data point associated with the system user or to evaluate any other internal time series data point associated with any other system user, or the method 100 terminates if there are no more internal time series data points associated with system users to evaluate. If the internal time series data point associated with a system user meets the alert trigger condition for the system user, the method 100 proceeds to block 108 to reduce the system user's level of access.

If the internal time series data point associated with a system user meets the alert trigger condition for the system user, the time series database system reduces a level of access by the system user to the time series database system, block 108. For example and without limitation, this can include the time series database system suspending John Smith's access to the time series database system for one hour because the evaluation of the internal time series data point indicates that Smith's 1,600 web service API calls for the 5 computer nodes meets the alert trigger condition of 1,500 web service API calls per minute for the time series database system. The time series database system can detect system misuse or abuse by a system user, even when the system user is not exceeding any subcomponent thresholds. For example, the multiple time series data points for the 5 computer nodes in the cluster may each indicate that the system user John Smith has not exceeded the threshold of 500 web service API calls for any of the 5 computer nodes, but Smith's total of 1,600 web service API calls made by the combination of the 5 computer nodes meets the alert trigger condition of 1,500 web service API calls per minute for the time series database system as a whole.

Reducing a level of access by a system user to the time series database system may be based on a reduction in the level of access by the system user to the time series database system and/or at least one of the subsystems of the time series database system for a fixed time period or an indefinite period of time. For example, the time series database system temporarily suspends John Smith's access to the time series database system's subsystem for writing data to the time series database system, but allows a continuation of John Smith's access to the time series database system's subsystem for reading data from the time series database system. In another example, the time series database system indefinitely suspends John Smith's access to the time series database system.

Furthermore. reducing a level of access by a system user to the time series database system may be a reduction in the level of access by multiple system users to the time series database system and/or at least one of the subsystems of the time series database system. For example, each of the 5 computer nodes in a cluster will continue to allow writes to a node's discs until the discs are 95% full, based on the premise that other nodes in the cluster have additional available disc space. Continuing this example, the time series database system indefinitely suspends all users' access to write data to any node's discs because 90% of the combined disc space for all 5 nodes in the cluster is full, but the time series database system allows all systems users to continue their read access from the 5 nodes' discs until a system administrator can address the problem with the discs' storage capacity.

The time series database system may output an alert to inform a system user and/or a system administrator that the internal time series data point associated with the system user meets the alert trigger condition for the system user. For example, the time series database system may output an alert email to inform John Smith and a system administrator that Smith's 1,600 web service API calls per minute for the 5 computer nodes exceeded 1,500 web service API calls per minute for the time series database system, and that the time series database system temporarily suspended Smith's access to the time series database system.

In another example, the time series database system outputs an alert email to inform John Smith and a system administrator that Smith's 1,600 web service API calls per minute for the 5 computer nodes exceeded 1,500 web service API calls per minute for the time series database system, and that the time series database system temporarily reduced Smith's access to the time series database system to 750 web service API calls per minute. Although these examples describe the time series database system communicating an alert notification via an email, the time series database system may communicate an alert notification via any combination of communications including emails, text messages, display screen updates, audible alarms, social network posts, tweets, writes to database records, etc. The system may also communicate an alert notification to a computer system, even the time series database system itself, in the form of control feedback, such that the computer system receiving the alert notification can take an action to mitigate an imminent failure.

If the time series database system reduces a level of access by a system user to the time series database system, the time series database system optionally increases a level of access by the system user to time series database system in response to a system administrator or a fixed time period expiration, block 110. By way of example and without limitation, this can include the time series database system reinstating John Smith's previous level of access to the time series database system one hour after temporarily suspending Smith's access to the time series database.

In another example, a system administrator receives John Smith's email explanation about Smith's 1,600 web service API calls per minute for the 5 computer nodes, and responds by reinstating Smith's previous level of access to the time series database system, thereby lifting the time series database system indefinite suspension of Smith's access to the time series database system.

In yet another example, after the time series database system reinstates John Smith's previous level of access to the time series database system one hour after temporarily suspending Smith's access to the time series database, the time series database system suspends John Smith's access to the time series database system for six hours because Smith's 1,550 web service API calls per minute for the 5 computer nodes exceeded 1,500 web service API calls per minute for the time series database system on a second occasion.

The time series database system may progressively increase the severity of each successive level of access reduction for the same system user based on historical records of the system user's level of access reductions, whether or not each level of access reduction is based on meeting the same alert trigger condition. For example, after a system user repeatedly exceeds alert trigger conditions, the time series database system indefinitely suspends the system user, a level of access reduction that can only be lifted by a system administrator, rather than suspending the system user for the duration of a longer expiring time period.

The method 100 may be repeated as desired. Although this disclosure describes the blocks 102-110 executing in a particular order, the blocks 102-110 may be executed in a different order. In other implementations, each of the blocks 102-110 may also be executed in combination with other blocks and/or some blocks may be divided into a different set of blocks.

Figure 2:
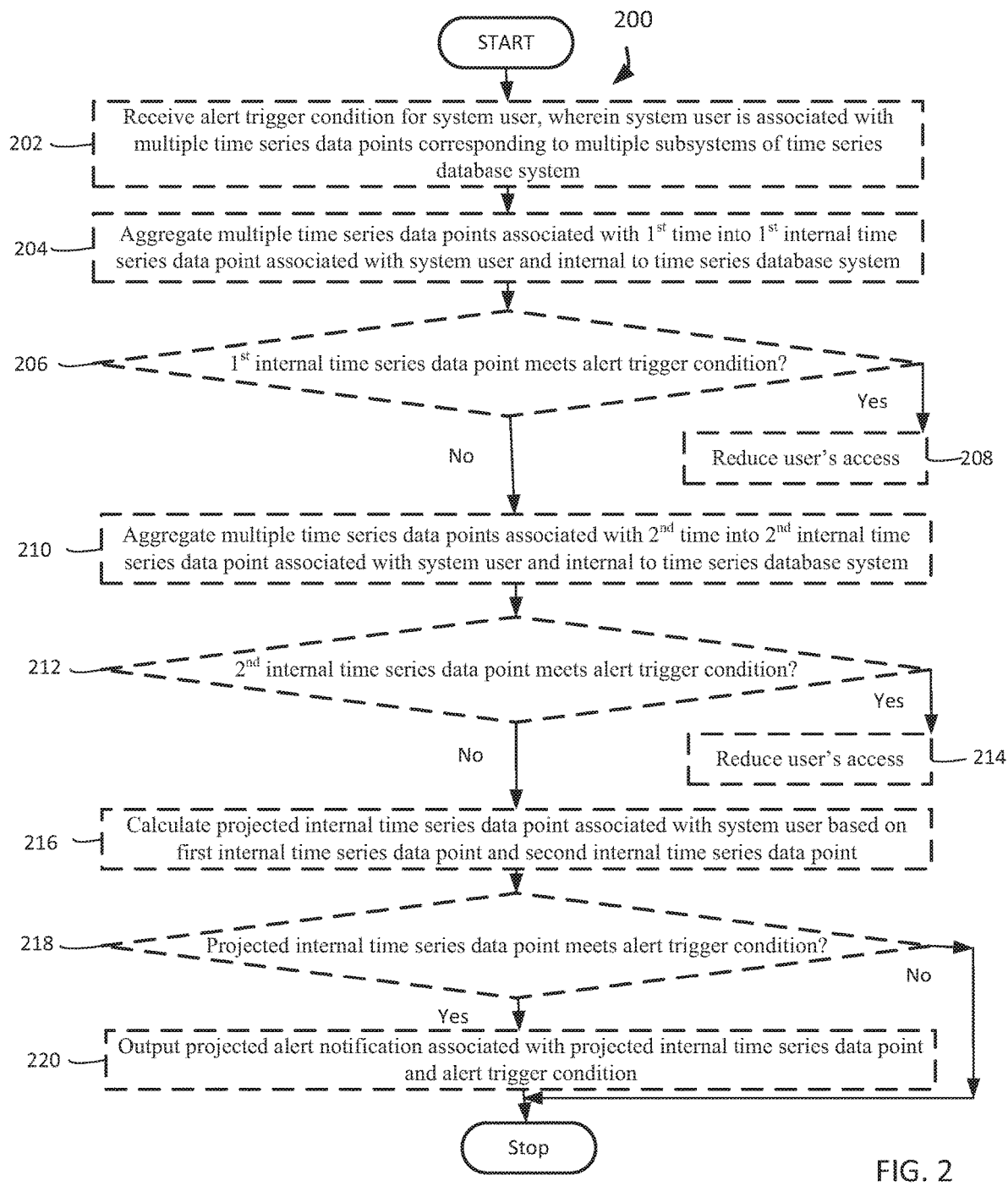
FIG. 2 is an operational flow diagram illustrating a high level overview of a method for a self-monitoring time series database system which enforces usage policies based on monitoring rate of change, in an embodiment.

FIG. 2 depicts an operational flow diagram illustrating a high level overview of a method 200 for a self-monitoring time series database system which enforces usage policies based on monitoring rate of change. A time series database system optionally receives an alert trigger condition for a system user, wherein the system user is associated with multiple time series data points corresponding to multiple subsystems of the time series database system, block 202. For example and without limitation, this can include a system administrator for a time series database system submitting an alert trigger condition of 1,500 web service API calls per minute for the system user named John Smith for when Smith uses a cluster of 5 computer nodes, and alert trigger conditions of 500 web service API calls per minute for Smith for when he uses each of the 5 computer nodes.

Continuing this example, the time series database system identifies 5 time series data points associated with the system user John Smith, which indicate Smith's web service API calls for the 5 computer nodes within the time series database system. Although this example describes the time series database system identifying the multiple time series data points that are associated with the alert trigger condition, a system administrator may identify the multiple time series data points that are associated with the alert trigger condition when submitting the alert trigger condition. While this example describes the time series database system receiving and processing a single alert trigger condition for a single system user associated with multiple time series data points corresponding to multiple subsystems of the time series database system, the time series database system may receive and process any number of alert trigger conditions for any number of system users.

Even though the foregoing example describes the time series database system receiving an alert trigger condition for a system user from a system administrator, the time series database may also receive an alert trigger condition for a system user from a configuration file. For example, upon startup, the time series database system initially receives an alert trigger condition of 2,000 web service API calls per minute for each system user from a configuration file that was pre-configured prior to startup of the time series database system. Continuing this example, after months of operation, the time series database system receives an alert trigger condition of 1,500 web service API calls per minute for each system user from a system administrator who decided that the alert trigger condition of 2,000 web service API calls per minute for each system user was set too high for responding to the corresponding alert notification in a timely manner.

After receiving the alert trigger condition for a system user associated with multiple time series data points, the time series database system optionally aggregates the multiple time series data points associated with a first time into a first internal time series data point associated with the system user and internal to the time series database system, block 204. By way of example and without limitation, this can include the time series database system creating a global counter, aggregating the 5 time series data points, which indicate Smith's 1,200 web service API calls for the 5 subsystems at 11:02 A.M., into the global counter, disabling subsystem aggregation to the global counter, copying the aggregated value of 1,200 in the global counter to a temporary data structure, resetting the global counter to zero, enabling subsystem aggregation to the global counter, and persisting the aggregated value of 1,200 in the temporary data structure into a first internal time series data point for the system user John Smith in the time series database system.

Although this example describes the time series database system aggregating a single internal time series data point for one system user from multiple corresponding time series data points, the time series database system may aggregate any number of internal time series data points for any number of system users from their multiple corresponding time series data points While this example describes the time series database system copying the aggregated value in the global counter to a temporary data structure, and then persisting the aggregated value in the temporary data structure to an internal time series data point for a system user, the time series database system may also copy the aggregated value in the global counter to an internal time series data point for a system user.

After aggregating the multiple time series data points associated with the first time into the first internal time series data point associated with the system user, the time series database system optionally evaluates whether the first internal time series data point associated with the system user meets the alert trigger condition, block 206. In embodiments, this can include the time series database system evaluating whether the first internal time series data point aggregating the 5 time series data points, which indicate a total of Smith's 1,200 web service API calls for the 5 subsystems at 11:02 A.M., meets the alert trigger condition of 1,500 web service API calls per minute for Smith when using the time series database system.

Although the foregoing example describes an alert trigger condition based on an internal time series data point associated with a system user meeting an alert threshold only once, the alert trigger condition may be met when an internal time series data point associated with a system user meets an alert threshold for any time period, such as 5 consecutive minutes, or when an internal time series data point associated with a system user meets an alert threshold any number of times in any time period, such as by meeting an alert threshold at least 7 times in any time period of 13 consecutive minutes. This example describes the time series database system evaluating an internal time series data point associated with a system user on a minute-to-minute basis. In some embodiments, the periodic evaluation period may be of any time duration, such as seconds or hours. Further, this example describes the time series database system evaluating whether a single internal time series data point associated with a single system user meets a single alert trigger condition. In some embodiments, the time series database system may evaluate any number of internal time series data points associated with any number of system users, and then the time series database system may evaluate whether each one of these internal time series data points associated with a system user meets any number of alert trigger conditions.

If the first internal time series data point associated with the system user meets the alert trigger condition, the method 200 continues to block 208 to reduce the level of access by the system user to the time series database system. If the first internal time series data point associated with the system user does not meet the alert trigger condition, the method 200 proceeds to block 210 to aggregate the multiple time series data points for the multiple subsystems into a second internal time series data point associated with the system user. If the first internal time series data point associated with the system user meets the alert trigger condition, the time series database system optionally reduces the level of access by the system user to the time series database system, block 208. For example and without limitation, this can include the time series database system suspending John Smith's access to the time series database system for one hour because the evaluation of the first internal time series data point indicates that Smith's 1,600 web service API calls for the 5 computer nodes meets the alert trigger condition of 1,500 web service API calls per minute for Smith when using the time series database system.

If the first internal time series data point associated with the system user does not meet the alert trigger condition, the time series database system optionally aggregates the multiple time series data points associated with a second time into a second internal time series data point associated with the system user and internal to the time series database system, block 210. By way of example and without limitation, this can include the time series database system aggregating the 5 time series data points for the 5 subsystems, which indicate Smith's total of 1,300 web service API calls for the 5 subsystems at 11:03 A.M., into a second internal time series data point for John Smith. The time series database system may aggregate the second internal time series data point associated with the system user similarly to how the time series database system aggregated the first internal time series data point associated with the system user, as described above.

After aggregating the multiple time series data points associated with the second time into the second internal time series data point associated with the system user, the time series database system optionally evaluates whether the second internal time series data point associated with the system user meets the alert trigger condition, block 212. In embodiments, this can include the time series database system evaluating whether the second internal time series data point indicating Smith's 1,300 web service API calls for the 5 subsystems at 11:03 A.M. meets the alert trigger condition of 1,500 web service API calls per minute for John Smith. If the second internal time series data point associated with the system user meets the alert trigger condition, the method 200 continues to block 214 to reduce a level of access by the system user to the time series database. If the second internal time series data point associated with the system user does not meet the alert trigger condition, the method 200 proceeds to block 216 to calculate a projected internal time series data point associated with the system user based on the first internal time series data point associated with the system user and the second internal time series data point associated with the system user.

If the second internal time series data point associated with the system user meets the alert trigger condition, the time series database system optionally reduces a level of access by the system user to the time series database, block 214. For example and without limitation, this can include the time series database system suspending John Smith's access to the time series database system for one hour because the evaluation of the second internal time series data point indicates that Smith's 1,600 web service API calls for the 5 computer nodes meets the alert trigger condition of 1,500 web service API calls per minute for when Smith uses the time series database system.

If the second internal time series data point associated with the system user does not meet the alert trigger condition, the time series database system optionally calculates a projected internal time series data point associated with the system user based on the first internal time series data point associated with the system user and the second internal time series data point associated with the system user, block 216. By way of example and without limitation, this can include the time series database system calculating a projected internal time series data point of 1,500 web service API calls per minute for John Smith at 11:05 A.M. based on 1,200 web service API calls per minute for John Smith at 11:02 A.M. and 1,300 web service API calls per minute for John Smith at 11:03 A.M.

Calculating the projected internal time series data point associated with the system user may be based on the first internal time series data point associated with the system user and/or the second internal time series data point associated with the system user meeting a data threshold. For example, since the first internal time series data point's value of 1,200 web service API calls per minute for John Smith and the second internal time series data point's value of 1,300 web service API calls per minute for John Smith are both above the 50% threshold of the alert trigger condition of 1,500 web service API calls per minute for John Smith, the time series database system calculates the projected internal time series data point for John Smith. In another example, if the first internal time series data point's value of 600 web service API calls per minute for John Smith and the second internal time series data point's value of 650 web service API calls per minute for John Smith are both below the 50% threshold of the alert trigger condition of 1,500 web service API calls per minute for John Smith, the time series database system does not calculate the projected internal time series data point for John Smith, thereby avoiding unnecessary calculations Although this example describes the time series database system calculating the projected internal time series data point associated with the system user based on only two internal time series data points associated with the system user, the time series database system may calculate the projected internal time series data point associated with the system user based on any number of internal time series data points associated with the system user. This example describes the time series database system calculating the projected internal time series data point associated with the system user based on a liner projection. In some embodiments, the time series database system may calculate the projected internal time series data point associated with the system user based on any type of projection, such as exponential, logarithmic, or regression analysis, or combination thereof. Furthermore, this example describes the time series database system calculating the projected internal time series data point associated with the system user based on meeting the alert trigger condition. In some embodiments, the time series database system may calculate the projected internal time series data point based on a specified amount of time into the future, and then evaluate whether the projected internal time series data point associated with the system user meets the alert trigger condition within a specified time threshold.

After calculating the projected internal time series data point associated with the system user, the time series database system evaluates whether the projected internal time series data point associated with the system user meets the alert trigger condition, block 218. In embodiments, this can include the time series database system evaluating whether the projected internal time series data point of 1,500 web service API calls per minute for John Smith at 11:05 A.M. meets the alert trigger condition of 1,500 web service API calls per minute for Smith. Evaluating whether the projected internal time series data point associated with the system user meets the alert trigger condition may be based on meeting a time threshold. For example, if the projected internal time series data point associated with the system user is projected to meet the alert trigger condition in 5 minutes, the time series database system processes the projected internal time series data point associated with the system user as having met the alert trigger condition. In another example, if the projected internal time series data point associated with the system user is projected to meet the alert trigger condition in 5 months, the time series database system processes the projected internal time series data point associated with the system user as having not met the alert trigger condition If the projected internal time series data point associated with the system user meets the alert trigger condition, the method 200 continues to block 220 to output a projected alert notification. If the projected internal time series data point associated with the system user does not meet the alert trigger condition, the method 200 terminates.

If the projected internal time series data point associated with the system user meets the alert trigger condition, the time series database system optionally outputs a projected alert notification associated with the projected internal time series data point and the alert trigger condition, block 220. For example and without limitation, this can include the time series database system outputting an alert email to inform John Smith (and the system administrator) that Smith's web service API calls for the 5 subsystems is projected to be 1,500 web service API calls per minute at 11:05 A.M, which would result in a suspension of Smith's access to the time series database system. Although this example describes the time series database system communicating a projected alert notification via an email, the time series database system may communicate a projected alert notification via any combination of communications including emails, text messages, display screen updates, audible alarms, social network posts, tweets, writes to database records, etc. Thus, the self-monitoring time series database system of the present disclosure is advantageous in that it monitors the system user's usage of the time series database system based on projecting time series data that reflects multiple points in time.

The method 200 may be repeated as desired. Although this disclosure describes the blocks 202-220 executing in a particular order, the blocks 202-220 may be executed in a different order. In other implementations, each of the blocks 202-220 may also be executed in combination with other blocks and/or some blocks may be divided into a different set of blocks.

System Overview

Figure 3:
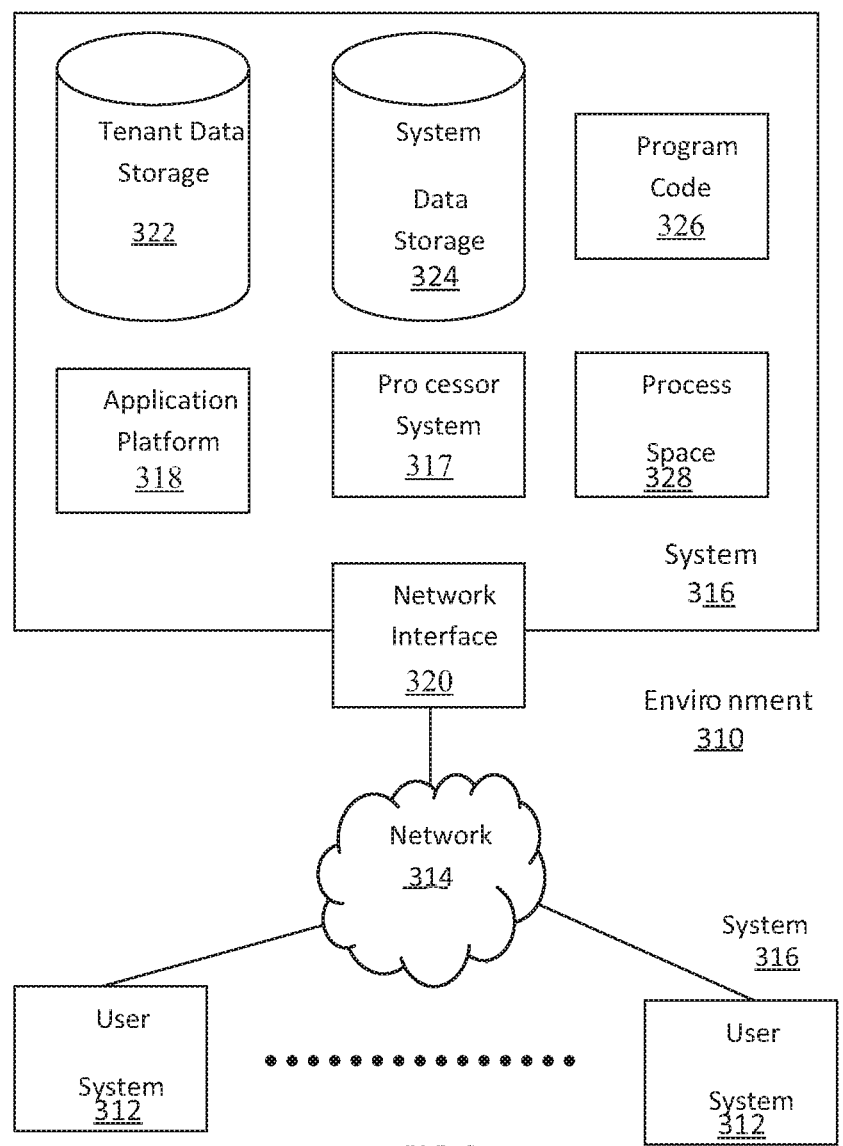
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 12 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
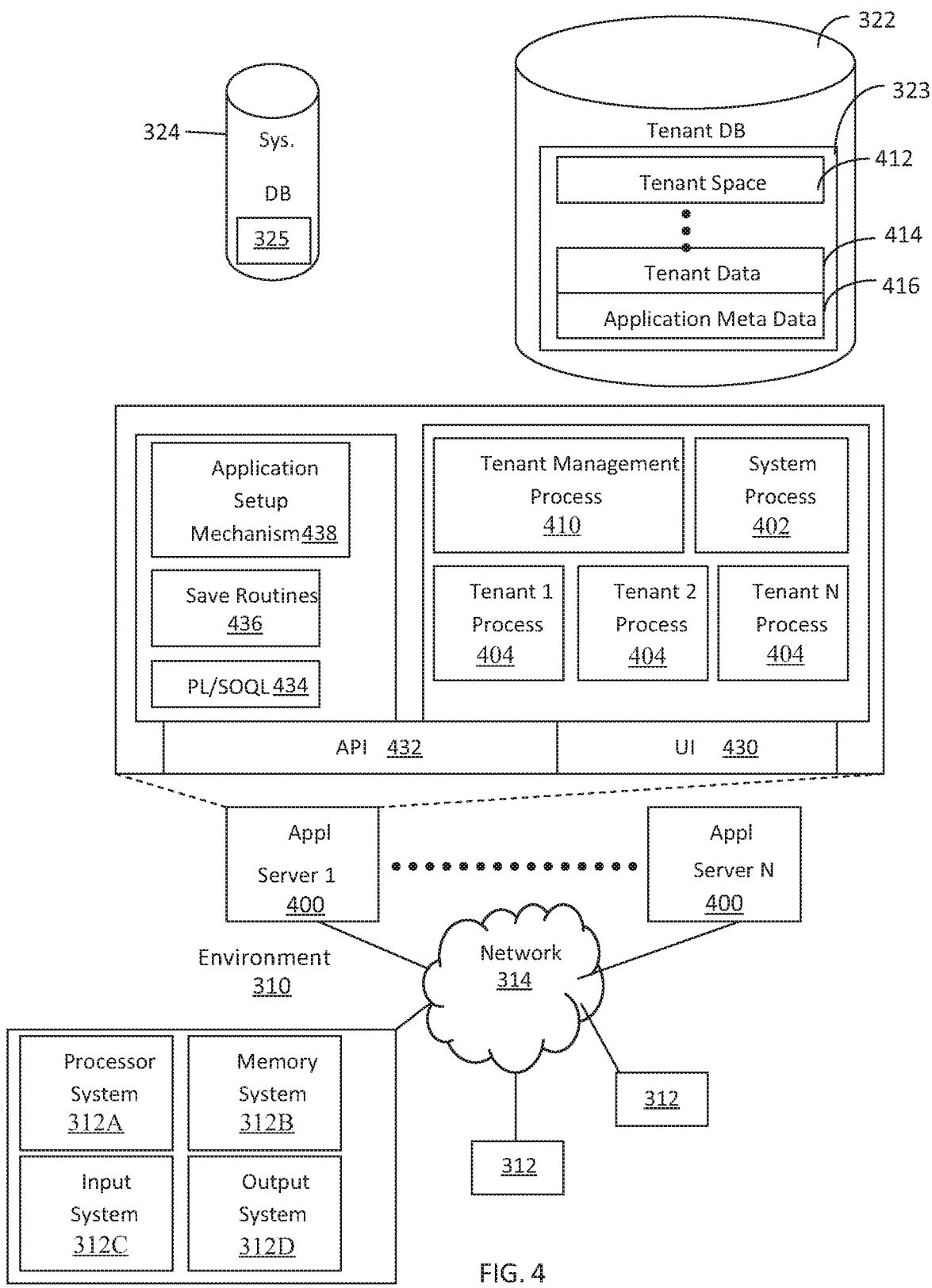
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 400₁-400ₙ, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in reference to FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 216) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for a self-monitoring time series database system which enforces usage policies, the system comprising:
   one or more processors; and
   a non-transitory computer readable medium storing a plurality of instructions, which when executed, cause the one or more processors to:

receive, by a time series database system that has multiple subsystems, an alert trigger condition for a threshold-exceeding level of aggregated access to the multiple subsystems by a single user who is associated with multiple time series data points corresponding to the multiple subsystems;

aggregate, by the time series database system, the multiple time series data points in an internal time series data point associated with the single user, the internal series data point being internal to the time series database system;

determine, by the time series database system, whether the internal time series data point, associated with the single user exceeds the threshold level; and reduce, by the time series database system, a level of aggregated access by the single user to at least one of the multiple subsystems of the time series database system in response to a determination that the internal time series data point associated with the single user exceeds the threshold-exceeding level of aggregated access to the multiple subsystems by the single user; and increase the level of aggregated access by the single user to at least one of the multiple subsystems of the time series database system in response to one of a system administrator and a fixed time period expiration, when the single user's access is not indefinitely suspended.

2. The system of claim 1, wherein receiving the alert trigger condition comprises receiving the alert trigger condition from at least one of a system administrator and a configuration file.

3. The system of claim 1, wherein the alert trigger condition comprises at least one of a system threshold associated with the time series database system and a subsystem threshold associated with at least one of the multiple time series data points corresponding to at least one of the multiple subsystems of the time series database system.

4. The system of claim 1, wherein aggregating the multiple time series data points in the internal time series data point associated with the single user comprises:
creating a global counter;
aggregating the multiple time series data points in the global counter;
disabling subsystem aggregation to the global counter;
copying a value in the global counter to a data structure;
resetting the global counter;
enabling subsystem aggregation to the global counter; and
persisting the value in the data structure to the internal time series data point associated with the single user.

5. The system of claim 1, wherein reducing the level of aggregated access by the single user is based on a reduction in the level of aggregated access by the single user to at least one of the time series database system and at least one of the multiple subsystems of the time series database system for one of a fixed time period and an indefinite period of time.

6. The system of claim 1, wherein reducing the level of aggregated access by the single user comprises a reduction in the level of aggregated access by a plurality of single users to at least one of the time series database system and at least one of the multiple subsystems of the time series database system.

7. A computer program product comprising computer-readable program code to be executed by one or more processors when retrieved from a non-transitory computer-readable medium, the program code including instructions to:

receive, by a time series database system that has multiple subsystems, an alert trigger condition for a threshold-exceeding level of aggregated access to the multiple subsystems by a single user who is associated with multiple time series data points corresponding to the multiple subsystems;

aggregate, by the time series database system, the multiple time series data points in an internal time series data point associated with the single user, the internal series data point being internal to the time series database system;

determine, by the time series database system, whether the internal time series data point, associated with the single user exceeds the threshold level; and reduce, by the time series database system, a level of aggregated access by the single user to at least one of the multiple subsystems of the time series database system in response to a determination that the internal time series data point associated with the single user exceeds the threshold-exceeding level of aggregated access to the multiple subsystems by the single user; and increase the level of aggregated access by the single user to at least one of the multiple subsystems of the time series database system in response to one of a system administrator and a fixed time period expiration, when the single user's access is not indefinitely suspended.

8. The computer program product of claim 7, wherein receiving the alert trigger condition comprises receiving the alert trigger condition from at least one of a system administrator and a configuration file.

9. The computer program product of claim 7, wherein the alert trigger condition comprises at least one of a system threshold associated with the time series database system and a subsystem threshold associated with at least one of the multiple time series data points corresponding to at least one of the multiple subsystems of the time series database system.

10. The computer program product of claim 7, wherein aggregating the multiple time series data points in the internal time series data point associated with the single user comprises:
creating a global counter;
aggregating the multiple time series data points in the global counter;
disabling subsystem aggregation to the global counter;
copying a value in the global counter to a data structure;
resetting the global counter;
enabling subsystem aggregation to the global counter; and
persisting the value in the data structure to the internal time series data point associated with the single user.

11. The computer program product of claim 7, wherein reducing the level of aggregated access by the single user is based on a reduction in the level of aggregated access by the single user to at least one of the time series database system and at least one of the multiple subsystems of the time series database system for one of a fixed time period and an indefinite period of time.

12. The computer program product of claim 7, wherein reducing the level of aggregated access by the single user comprises a reduction in the level of aggregated access by a plurality of single user's to at least one of the time series database system and at least one of the multiple subsystems of the time series database system.

13. A method for a self-monitoring time series database system which enforces usage policies, the method comprising:

receiving, by a time series database system that has multiple subsystems, an alert trigger condition for a threshold-exceeding level of aggregated access to the multiple subsystems by a single user who is associated with a multiple time series data points corresponding to the multiple subsystems;

aggregating, by the time series database system, the multiple time series data points in an internal time series data point associated with the single user, the internal series data point being internal to the time series database system;

determining, by the time series database system, whether the internal time series data point, associated with the single user exceeds the threshold level; and reducing, by the time series database system, a level of aggregated access by the single user to at least one of the multiple subsystems of the time series database system in response to a determination that the internal time series data point associated with the single user exceeds the threshold-exceeding level of aggregated access to the multiple subsystems by the single user; and increasing the level of aggregated access by the single user to at least one of the multiple subsystems of the time series database system in response to one of a system administrator and a fixed time period expiration, when the single user's access is not indefinitely suspended.

14. The method of claim 13, wherein receiving the alert trigger condition comprises receiving the alert trigger condition from at least one of a system administrator and a configuration file.

15. The method of claim 13, wherein the alert trigger condition comprises at least one of a system threshold associated with the time series database system and a subsystem threshold associated with at least one of the multiple time series data points corresponding to at least one of the multiple subsystems of the time series database system.

16. The method of claim 13, wherein aggregating the multiple time series data points in the internal time series data point associated with the single user comprises:
creating a global counter;
aggregating the multiple time series data points in the global counter;
disabling subsystem aggregation to the global counter;
copying a value in the global counter to a data structure;
resetting the global counter;
enabling subsystem aggregation to the global counter; and
persisting the value in the data structure to the internal time series data point associated with the single user.

17. The method of claim 13, wherein reducing the level of aggregated access by the single user is based on a reduction in the level of aggregated access by the single user to at least one of the time series database system and at least one of the multiple subsystems of the time series database system for one of a fixed time period and an indefinite period of time.

18. The method of claim 13, wherein reducing the level of aggregated access by the single user comprises a reduction in the level of aggregated access by a plurality of single users to at least one of the time series database system and at least one of the multiple subsystems of the time series database system.

* * * * *